No. 895,410.
PATENTED AUG. 11, 1908.
J. H. ALLIN.
NUT LOCK.
APPLICATION FILED SEPT. 7, 1904. RENEWED MAR. 22, 1907.
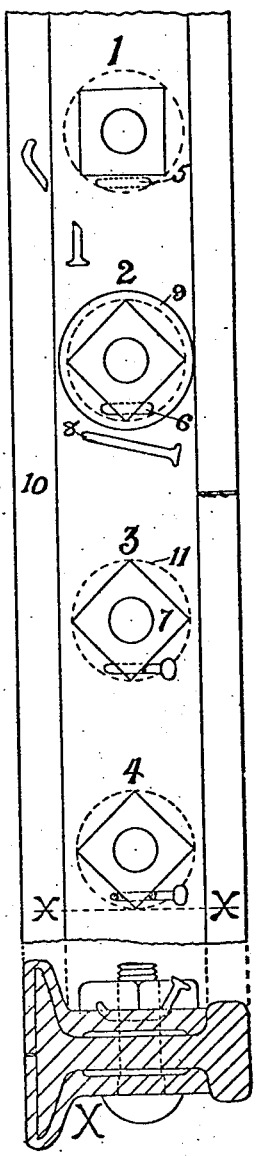
WITNESSES
INVENTOR

UNITED STATES PATENT OFFICE.

JAMES HAYS ALLIN, OF EAST CHATTANOOGA, TENNESSEE.

NUT-LOCK.

No. 895,410.     Specification of Letters Patent.     Patented Aug. 11, 1908.

Application filed September 7, 1904, Serial No. 223,659. Renewed March 22, 1907. Serial No. 363,956.

*To all whom it may concern:*

Be it known that I, JAMES HAYS ALLIN, a citizen of the United States, residing at East Chattanooga, in the county of Hamilton and State of Tennessee, have invented new and useful Improvements in Nut-Locks, of which the following is a specification, reference being had to accompanying drawing as a part thereof, illustrating said locking means applied to four bolt joints used in forming one strong connection, with cross section X of lock 4, taken at X—X.

This invention relates to said locking means with its primary object to provide said means, which preferably consists of a simple locking pin and socket therefor, light, simple and cheap: of easy and quick manipulation; applicable to devices after the parts have been bolted or clamped together and hence to all commercial joints, bolts and nuts; and to dispense with the necessity of double nutting for such locking purposes. Hence it will be observed, that, the invention is applicable to a screw having a suitable head, to a screw shaped bolt having but one head, to either head of a bolt provided with a pair of clamping heads with one or both of said heads removable and adjustable, as a nut, for graduating the clamping length of said bolt, to a plurality of nuts used successively on the same bolt, with provision for locking means between said nuts, to clamping bolt washers, especially to washers for use in wooden joints, and, indeed, to retaining and clamping devices in general.

Referring to the drawing or figure, which is a plain side elevation with end section X taken at X—X, numerals 1, 2, 3 and 4, each successively indicates a bolt-joint and locking means therefor: with said locking means consisting of a locking groove, 5, as in lock 1, converted into a locking socket 6, as in locks 2, 3, and 4, by turning the bolt-head or nut 7, across the central portion of groove 5, adapted thereafter to receive and carry a locking pin, preferably a small commercial wire nail 8, with automatic curving effect upon said pin at its projecting ends which come in close contact with the sides of the nut as said pin enters and projects from said socket. as in lock 3 or 4, for lockingly engaging the frictional parts or members which form and carry said socket. After the joint has been properly clamped and locked the projecting end of the locking pin may then be bent down out of the way upon the face of the underlying slotted member. Said bolt head or nut 7, frictionally presses the adjoining washer 9, or plate 10, in its rotary clamping and unclamping action; therefore the ends of the locking groove should lie entirely within the extreme circuit of the nut, in order to automatically bend the pin into direct and fixed locking engagement with the nut, and as indicated by the dotted circle 11. Dotted line 11 represents the frictional circuit of the bolt head or nut. Any frictional member of the bolt joint may carry the locking groove; but preferably, the locking groove should lie to one side of and free from the nut or clamping head of the bolt when said nut or head is turned sidewise to the groove as illustrated in lock 1. The locking pin 8, is forced endwise into said socket with curved, anti-rattle, secure locking effect against both the clamping and unclamping action of said nut 7. This arrangement allows the joint to be quickly unlocked by using the said companion frictional parts as a pair of pliers to cut off either end of the locking pin, also illustrated in lock 1, which may be done in heavy joints by means of strong long handled wrenches, such as are in common use for bolting railroad rails together. This arrangement allows the remainder of the nail to drop out as the groove is uncovered by the turning of the nut; or said locking pin may be withdrawn with claws, as with a claw-hammer.

The deep groove with its sharp quick bend or curve outwardly at its end close to the nut, not only imparts the desired locking shape to the pin as it enters but also firmly sustains said pin in its place in use; either end being sufficient in itself to shape and sustain its respective end of the pin.

Common or usual means for preventing the bolt itself from turning in the clamped parts of the joint may be employed when used supplementary to the locking means herein set forth.

Having thus fully described my invention, what I claim as new and desire to secure by Letters Patent of the United States, is:

1. In an automatic nut or bolt lock, the combination with an angular clamping member having a smooth under surface, of an underlying part forming a seat for said member and provided with a groove-like socket constructed and arranged with reference to said member so as to be crossed by a corner of said member when the latter is in a locking position, and having an outwardly turned end closely adjacent to a side of said member in such locking position, and a bendable locking pin adapted to be driven endwise into said socket and to be automatically bent by the latter into its final locking shape and contacting with said adjacent side of said member, whereby said member is automatically locked by driving said pin endwise and without manually bending the pin, the pin being automatically bent, retained and supported by the end of the socket.

2. In an automatic nut or bolt lock, the combination with an angular clamping member having a smooth under surface, of an underlying part forming a seat therefor and provided with a groove-like socket constructed and arranged with reference to said member so as to be crossed by a corner of said member when the latter is in locking position, and having outwardly turned ends closely adjacent to opposite sides of said member in such locking position, and a bendable locking-pin adapted to be driven endwise into said socket and to be automatically bent by the latter into its final locking shape and contacting with opposite sides of said member, whereby said member is automatically locked by driving said pin endwise and without manually bending the pin, the pin being automatically bent, retained and supported by the end of the socket.

3. In an automatic nut or bolt lock, the combination with an angular clamping member having a smooth under surface and with a bendable pin as means for locking the same, of a seat forming part underlying said member with a straight groove-like socket parallel with one of the sides of said member when the latter is turned sidewise thereto and arranged to be crossed by a corner of said member in its locking position, said socket being constructed with an outwardly turned end closely adjacent to one of the sides of said member and adapted to form a pin bending, retaining and supporting surface opposed to said side, whereby the pin is automatically bent into contact with such side and retained and supported in contact therewith by the end of the socket.

4. In an automatic nut or bolt lock, the combination with an angular clamping member having a smooth under surface and with a bendable pin as means for locking the same, of a seat forming part underlying said member and provided with a straight groove-like socket parallel with and external to one of the sides of said member when said member is turned sidewise thereto and arranged to be crossed by a corner of said member in its locking position, said socket being constructed with outwardly turned ends which are exposed closely adjacent to opposite sides of said corner in such locking position and which are adapted to automatically bend the pin into contact with said sides and to also retain and support the same in locking contact therewith.

5. In an automatic nut or bolt lock, the combination with an angular clamping member having a smooth under surface and with a bendable pin as means for locking the same, of a seat forming part underlying said member and provided with a socket which in the locking position of said member extends beneath one corner of the same and is outwardly turned adjacent to the opposite sides which form said corner, whereby said socket is adapted to automatically bend said pin into contact with said sides when the pin is driven lengthwise into said socket, said pin being automatically bent, retained and supported against said sides of said member by the ends of said socket.

6. In an automatic nut or bolt lock, the combination of a nut and a bolt and member clamped thereby and a bendable locking pin centrally underlying a corner portion of the face of said nut and automatically bent, retained and supported against the side of the nut, said member clamped being provided with means for receiving and automatically bending said pin into such locking engagements when the pin is forced endwise beneath said nut and made to project outwardly to the side of the nut.

7. An article of manufacture, for combination with a nut and a bolt and a bendable locking pin in an automatic nut or bolt lock, comprising a device provided with a socket for said bolt and also provided with a slot in the face thereof for and adapted cross-sectionally to wholly carry the said locking pin and lying near and transversely disposed to said socket, said slot being abruptly turned outwardly at the end and adapted to centrally underly a corner portion of the face of the nut with said end projecting and terminating close to the side of the nut when in clamped locking relations thereto and thus adapted to automatically bend, retain and support the locking pin against the side of the nut when the pin is forced endwise into and through said slot.

8. In an automatic nut or bolt-lock, the combination, with a nut and a bolt, of a member clamped thereby and provided with a slot centrally underlying a corner portion of the face of said nut and a bendable locking pin inserted endwise into and projecting from said underlying slot and automatically bent thereby into locking relations with said nut and also supported in said locking relations by the end of said slot.

In testimony whereof I affix my signature, in presence of two witnesses.

J. HAYS ALLIN.

Witnesses:
WALTER ALLIN,
A. D. ALLIN.